United States Patent
Mueller

[15] 3,635,642
[45] Jan. 18, 1972

[54] MOLDING DEVICE

[72] Inventor: Ralph C. Mueller, 7000 Summit Avenue, Cincinnati, Ohio 45243

[22] Filed: Sept. 28, 1970

[21] Appl. No.: 76,136

Related U.S. Application Data

[63] Continuation-in-part of Ser. No. 709,548, Mar. 1, 1968, Pat. No. 3,530,540.

[52] U.S. Cl. ............................425/470, 249/155, 249/160
[51] Int. Cl. ................................................................B29c 1/00
[58] Field of Search.................18/34 R, DIG. 33, DIG. 44; 249/155, 160

[56] References Cited

UNITED STATES PATENTS

| | | | |
|---|---|---|---|
| 2,197,212 | 4/1940 | Hagemeyer | 18/DIG. 44 |
| 2,416,559 | 2/1947 | Wilson | 18/DIG. 33 |
| 2,981,997 | 5/1961 | Painter | 18/DIG. 44 |
| 3,100,911 | 8/1963 | Stilling | 18/DIG. 44 |
| 3,161,938 | 12/1964 | Graham | 18/DIG. 44 |
| 3,353,220 | 11/1967 | Lenoble | 18/DIG. 44 |
| 3,530,540 | 9/1970 | Mueller | 18/34 R |

*Primary Examiner*—L. Howard Flint, Jr.
*Attorney*—Pearce & Schaeperklaus

[57] ABSTRACT

An assembly of flexible strip articles, flexible metallic bands, and metallic surface all of which being magnetically fixedly held together for providing a stable molding apparatus about a form. One of the strip articles of the assembly comprises an elongated strip of magnetic material sandwiched between a pair of coextensively extending metal members one of which may include a base flange. An additional strip article composed of the magnetic material may be included as part of the assembly. The metallic bands are magnetically secured to the first strip article which in turn is magnetically secured to the metallic surface whereby such assembly constitutes a molding device.

4 Claims, 6 Drawing Figures

PATENTED JAN 18 1972 3,635,642

INVENTOR.
RALPH C. MUELLER
BY
Pearce and Schaeperklaus
ATTORNEYS—

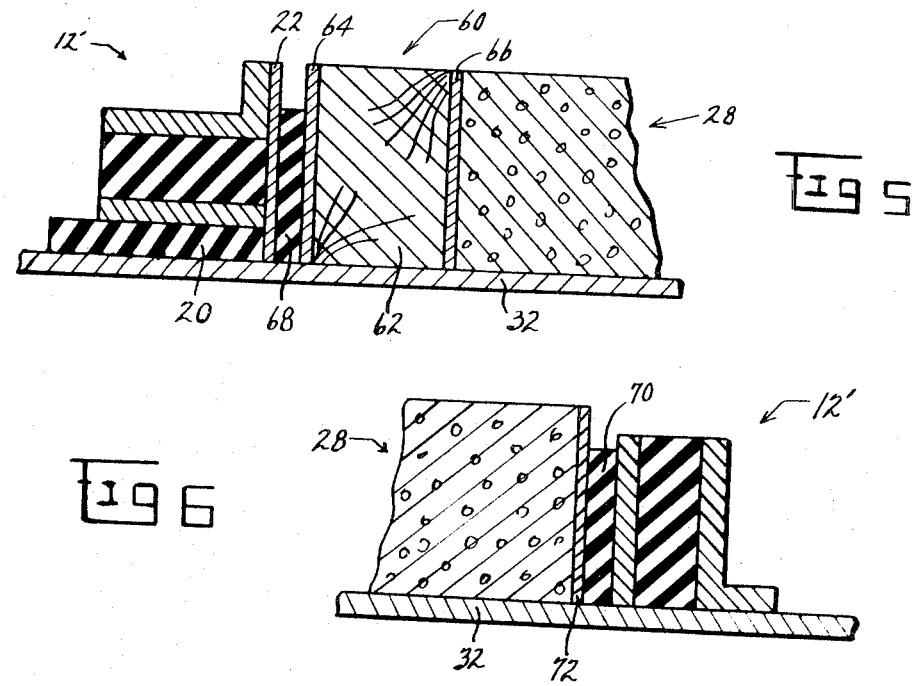

MOLDING DEVICE

This is a continuation-in-part of my copending application, Ser. No. 709,548, filed Mar. 1, 1968 now U.S. Pat. No. 3,530,540.

BACKGROUND OF THE INVENTION

Field of the Invention

The field of art to which the invention is most likely to pertain is generally located in the class of molding apparatus or elements, and particularly, in molding equipment generally utilized in the plastic industry. Class 18, Plastics, U.S. Pat. office classification, appears to be the applicable general area of art in which the claimed subject matter of the type involved here has been classified in the past.

SUMMARY

My invention relates to molding systems, and particularly relates to the combination of a minimum number of elements in a convenient, easy, economic and uncomplicated manner, whereby a smoothly molded product with clean-cut corners and edges, particularly along a smooth facing surface of the molded product, results.

An object of the invention is to provide for a molding device having flexible characteristics therein by which any one of a multiple number of forms for a plurality of variously shaped articles may be produced.

Another object of this invention is to provide for facile and quick assembly and disassembly of the molding device.

A further object of this invention is to provide for a highly finished product surface, devoid of voids, mounds and the like otherwise commonly associated with molded plastic articles.

Another object of this invention is to provide for elimination of movement or tilting of the molding device thereby maintaining a positive stationary disposition of such device to ensure proper molding form of the product produced.

These and other objects and advantages of the invention will become more apparent by a full reading of the following disclosure comprising a written description, appended claims thereto and accompanying drawings.

BRIEF DESCRIPTION OF THE DRAWINGS

FIG. 5 is a sectional view of another embodiment of the invention.

FIG. 6 is a sectional view of a variation in use of an embodiment of the invention.

DESCRIPTION OF THE PREFERRED EMBODIMENT

Figure 1:
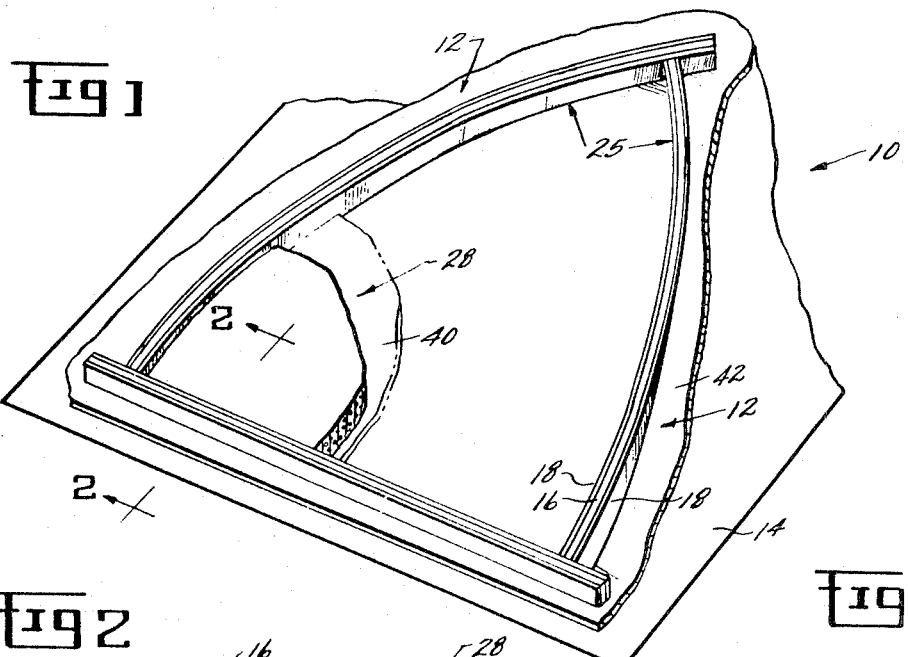
FIG. 1 is a perspective view of a molding device embodying the invention and as applied in forming a molded product.
Figures 2, 4:
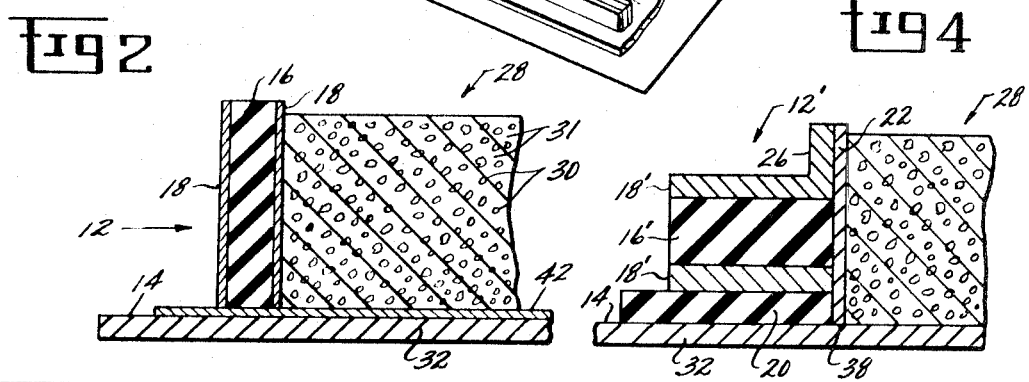
FIG. 2 is a view taken on line 2—2 of FIG. 1.
FIG. 4 is a view on line 4—4 of FIG. 3.

Referring now to the drawings in which reference characters correspond to like numerals in the following description, 10 represents the molding device embodying the invention. In developing an embodiment from the inventive concept, an assembly 12 comprising a strip of magnetic rubber or elastic material 16 sandwiched between a pair of flexible metallic members 18 was combined with and mounted upon a metallic surface 14 of a stainless steel sheet 32, as illustrated in FIGS. 1 and 2. A Mylar film or plastic sheet 42 may be included for providing finish to the ultimate product produced from a matrix 28, or to provide for use with an ordinary steel table instead of a stainless steel table. Each strip assembly 12 has a flexible characteristic due to the rubber center so that a variety of curvilinear boundaries, such as shown at 25 in FIG. 1 is available for molding device 10 and the formation of molded products therein.

Figure 3:
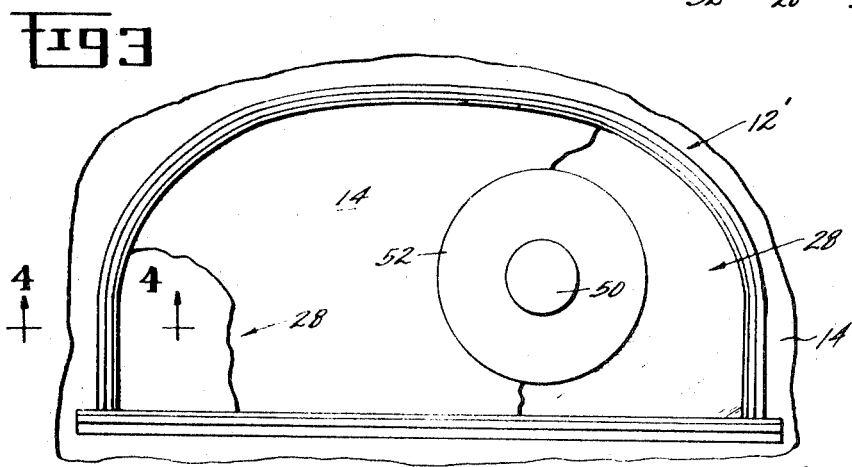
FIG. 3 is a plan view of a molding device embodying the invention.

Another embodiment of the inventive concept is illustrated in FIGS. 3 and 4. Strip assembly 12' comprises a strip of magnetic rubber or other elastic material 16' sandwiched between a pair of flexible members 18', a second strip of magnetic material 20 and a flexible metal band 22. The pair of flexible metal members 18', magnetic rubber strip 16' sandwiched therebetween and band 20 preferably constitute a single integral or unified element. Element 22 is available as a single commercial article. A suitable bonding agent between magnetic strip 16' and members 18' secures these strips together.

A flange 26 (FIG. 4) is formed at the base of one of the members 18' thereby providing for a wall flush with the coinciding bases of sandwiched material 16 and the other member 18'. Flange 26 provides support for flexible metal band 22 forming the molding wall for device 10. Band 22, likewise band 18, supports and retains a matrix 28 comprising aggregate 30 and resin 31 of moldable material poured into molding device 10. The extent of the lateral or upward linear dimension of flange 26 may also vary as a function of the depth to which matrix 28 is to be formed in molding device 10.

Bands 18 and 22 are commercially available in the form of metallic banding strips utilized in banding large cardboard cartons for commercial shipping purposes.

A stainless steel sheet 32 (FIGS. 2, 4) including a surface 14 assures a uniformly smooth finish of the surface in the finished molded product produced from matrix 28. Aggregate 30 may be formed of rock, crushed granules or the like and resin 31 may be either a thermoplastic or thermosetting resin. Preferably, sheet 32 is what is known as stainless steel-type 430, which includes magnetic characteristics, and also a highly glossy and smooth surface for attaining a smooth surfaced molded product.

In the embodiment illustrated in FIG. 4, strip 20 functions as a rubber sealing and foundation element, and is composed of the same magnetic material as that of sandwiched material 16'. It is utilized in one form under the strip assembly 12' shown in FIG. 4. Strip 20 is positioned between strip assembly 12' and sheet 32, and is provided to insure sealing of strip assembly 12' to surface 14 and elimination of marring or other damage thereto by the one metal member 18'. The axis of magnetism of the strip 20 is directed up and down, normal to the bands 18', with poles being at upper and lower surfaces of the strip 20 as shown in FIG. 4 so that the lower (unflanged) member 18' is drawn downwardly toward the sheet 32. The axis of magnetism of the sandwiched material 16' is directed to the right and left as shown in FIG. 4, parallel to the bands 18' and normal to the band 22 with poles located at the right-hand and left-hand surfaces of the sandwiched material 16' so that the band 22 is firmly held in upright position. Rubber foundation strip 20 is supported by sheet 32 and cooperates with vertically disposed metal band 22 to seal the mold, in addition to magnetically coacting with strip assembly 12' in operation of molding device 10, as will be more apparent in the description following.

In the assembly of device 10, foundation strip 20 is first mounted onto surface 14 of sheet 32, generally in accordance with a predetermined design to be incorporated into the mold. Thence, strip assembly 12', or its individual elements constituting same and as described aforesaid, is mounted thereon, after which metal band 22 is placed in abutting position to strip 20 and strip assembly 12', to form a wall of molding device 10 against which matrix 28 is supported and retained.

The proper relationship of the elements defined as molding device 10 provides for magnetic characteristics in device 10 which assures a firm, efficient, stable and positive stationary disposition of device 10. The pairs of metal members 18' are secured to sheet 32 by magnetizing effects of magnetic rubber material 16' upon sheet 32. Band 22 is secured in vertical abutting relationship to strip assembly 12' by the magnetizing effects between itself and such assembly 12'. A juncture 38, formed by metal band 22 and rubber foundation member 20, effectively seals the mold to prevent leakage of liquid resin therefrom in the molding process itself. Thus, a boundary for the ensuing molded product is created.

Some experimentation, reasonably limited, is required by an operator in assembling molding device 10. This involves a determination of magnetic polarity existing in the interplay of strip assembly 12', metal band 22, and magnetic rubber strip 20. In assembling, it is apparent that attraction or repulsion between these pieces may occur due to such polarity. If a repulsion occurs, it is a simple matter to reverse the lengths of strip assembly 12' and strip 20, one to the other, so that a magnetic polarity for attraction occurs. Such experimentation is also true with assembly 12.

The flexibility of position of strip assembly 12 and strip 20 upon sheet 32 provides for any one desired configuration of a plurality of molds into which a matrix 28 may be poured. A form 40 (FIG. 1), such as cardboard or the like, may be utilized to conform molding device 10 and its juncture 38 to a desired design. After such conformation, form 40 may be removed before pouring of aggregate 30 and resin 31. A fiberglass cloth (in position of sheet 42) may be initially spread upon sheet 32 to prevent excessive damage to sheet 32 be aggregate 30 and also to add strength to the finished poured product.

As shown in FIG. 3, a magnet 50 may be utilized to retain in position on surface 14 a form 52 should other than molding device 10 merely be used.

Another form of the invention is illustrated in FIG. 5. Assembly 12' with rubber member 20 supports a molding frame 60 comprising a wooden form 62 on the lateral faces of which metal sides 64 and 66 are suitably securely attached. A second strip of rubber magnetic material 68 magnetically secures assembly 12' to molding frame 60 whereby a secure tight fit of wooden form 62 to surface 14 of sheet 32 is obtained. This assembly assures elimination of tilting of frame 60.

FIG. 6 illustrates a variation of use of the molding assembly shown in FIG. 5. Assembly 12' is rotated counterclockwise through 90° from its position shown in FIG. 4 or FIG. 5. A rubber strip 70 and metal band 72 is then disposed as shown, being magnetically held against assembly 12' which in turn is magnetically secured to sheet 32. A matrix 28 of aggregate 30 is thence poured into the molding device to form a molded product after curing.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention. However, it should be clearly understood that the above description and illustrations are not intended to limit the scope of the appended claims, but that therefrom the invention may be practiced otherwise than as specifically described and exemplified herein, by those skilled in the art, and having the benefit of this disclosure.

Therefore, what I claim as patentably novel is:

1. In an edge forming member for a molding device for mounting on a magnetically attractable metallic sheet, the combination which comprises a pair of elongated spaced magnetically attractable bands, a strip of magnetic rubber material sandwiched between said pair of bands, and a second strip of magnetic rubber material mounted on an outer face of one of the bands.

2. A combination as in claim 1 wherein a third magnetically attractable metallic band is held by the sandwiched strip material and extends transversely of the other bands.

3. A combination as in claim 2 wherein the third band engages edges of the other bands.

4. A combination as in claim 1 wherein a flange is carried by one of the bands at an edge thereof extending normal thereto and a third magnetically attractable metallic band is held by the sandwiched strip material and extends transversely of the other bands and engages the flange.

* * * * *